United States Patent
Yamamoto

(10) Patent No.: US 6,619,137 B2
(45) Date of Patent: Sep. 16, 2003

(54) PLATE THICKNESS INSPECTING APPARATUS

(75) Inventor: Jiro Yamamoto, Kameoka (JP)

(73) Assignee: Meiken Lamwood Corporation, Okayama (JP)

( * ) Notice: Subject to any disclaimer, the term of this patent is extended or adjusted under 35 U.S.C. 154(b) by 0 days.

(21) Appl. No.: 10/181,809

(22) PCT Filed: Apr. 16, 2001

(86) PCT No.: PCT/JP01/03666

§ 371 (c)(1),
(2), (4) Date: Jul. 23, 2002

(87) PCT Pub. No.: WO02/29359

PCT Pub. Date: Apr. 11, 2002

(65) Prior Publication Data

US 2003/0009894 A1 Jan. 16, 2003

(30) Foreign Application Priority Data

Oct. 2, 2000 (JP) .......................... 2000-302320

(51) Int. Cl.⁷ .................................................. G01N 3/20
(52) U.S. Cl. ........................................ 73/852; 73/849
(58) Field of Search ................................ 73/865.8, 852, 73/849

(56) References Cited

U.S. PATENT DOCUMENTS

| | | | | |
|---|---|---|---|---|
| 4,564,296 A | * | 1/1986 | Oshida et al. ............... 356/630 |
| 4,879,752 A | * | 11/1989 | Aune et al. ................... 382/141 |
| 5,503,024 A | * | 4/1996 | Bechtel et al. ................. 73/852 |
| 5,686,993 A | * | 11/1997 | Kokubo et al. .............. 356/630 |
| 5,703,960 A | * | 12/1997 | Soest .......................... 382/141 |
| 6,100,986 A | * | 8/2000 | Rydningen ................... 356/630 |
| 6,396,590 B1 | * | 5/2002 | Wang et al. ................. 356/630 |
| 6,441,905 B1 | * | 8/2002 | Tojyo et al. ................. 356/429 |

FOREIGN PATENT DOCUMENTS

| | | |
|---|---|---|
| JP | 53-144863 | 11/1978 |
| JP | 8-334500 | 12/1996 |
| JP | 9-11203 | 1/1997 |
| JP | 10-097662 | 4/1998 |

OTHER PUBLICATIONS

Notice of Reason to Reject the JPO, dated Apr. 10, 2003.

* cited by examiner

Primary Examiner—Edward Lefkowitz
Assistant Examiner—Andre Allen
(74) Attorney, Agent, or Firm—Smith, Gambrell & Russell, LLP

(57) ABSTRACT

In a system for inspection of wood-board thickness, displacement sensors (2(21U, 22U, 23U, 21L, 22L, 23L)) are disposed at three positions with respect to a width of a wood material (1) being conveyed thereto for measurement of the thickness thereof. A programmable controller (6) determines the pass/fail of the board thickness based on the extent of portion having a board thickness deviated from the range of allowance extending along a conveyance direction.

5 Claims, 6 Drawing Sheets

PLATE THICKNESS INSPECTING APPARATUS

TECHNICAL FIELD

The present invention relates to an apparatus for inspecting a thickness of wood board.

BACKGROUND ART

Wood materials for use as construction materials and the like are worked to predetermined dimensions by means of a specific cutting system. However, there may be a case where a worked material may contain a portion decreased in thickness because of the warpage of the material before subjected to the cutting process. In the case of a wood board 100 with warpage as seen from a longitudinal end thereof as shown in FIG. 7, for example, the board generally has a predetermined thickness t1 if its portions out of cutting lines (upper and lower cutting lines) shown in FIG. 8 are cut off. However, a thickness t2 of a central portion of the resultant board is smaller than the thickness t1. If the smaller thickness t2 is not within the range of allowance for the predetermined thickness t1, such a wood material is rejected because of deficient thickness. Similarly, the resultant board further contains thinner portions at transversely opposite ends thereof. In a case where such a wood material is used as material for laminated lumber, there occurs a gap between the materials. Therefore, a sufficient bond area between the materials cannot be attained. In addition, a sufficient pressure cannot be applied to portions to be pressed for bonding. This results in bonding failure between the materials.

In this connection, it has been the conventional practice to have an inspector visually inspect each cut wood material for determining the presence of a portion decreased in thickness. Unfortunately, since the visual inspection is a time-consuming job, the cutting system must be programmed to operate slower so that the cutting operation may proceed in tandem with the inspection process. Accordingly, the production efficiency is lowered. Furthermore, the inspection must be done by well-trained inspectors and hence, the inspection results vary depending upon the individuals. As a result, the manufactured wood materials are varied in quality.

In view of the foregoing, it is an object of the present invention to provide an apparatus for inspection of board thickness which accomplishes a speedy inspection and ensures stable product quality.

DISCLOSURE OF INVENTION

An apparatus for inspection of board thickness according to the present invention comprises: an apparatus for conveying a wood material worked for adjustment of board thickness thereof to a predetermined value; a board-thickness measuring apparatus for determining board thicknesses at plural points of the wood material as a measurement subject conveyed thereto based on outputs from displacement sensors located at plural different positions with respect to a widthwise direction of the wood material; a processing unit for determining the wood material to be a thickness deficient one if it is determined from the measurement results given by the board-thickness measuring apparatus that there is a predetermined amount of portion having a board thickness deviated from a range of allowance for the predetermined value along a conveyance direction; and a device for differentiating the wood material determined to be the thickness deficient one from the other wood materials (claim 1).

In the apparatus for inspection of board thickness arranged as mentioned above, the board-thickness measuring apparatus measures the thicknesses at plural points of the wood material as the measurement subject conveyed thereto. The processing unit determines the wood material to be a thickness deficient one if there is a predetermined amount of portion having the board thickness deviated from the range of allowance along the conveyance direction. The wood material determined to be the thickness deficient one is differentiated from the other wood materials. Thus is provided the apparatus for inspection of board thickness which ensures a speedy inspection and stable product quality without relying on the visual inspection.

In the above apparatus for inspection of board thickness (claim 1), the processing unit may determine the wood material to be a thickness deficient one based on at least one of the conditions that: the portion having the board thickness deviated from the range of allowance extends a predetermined length L1 or more along the conveyance direction, and not less than a predetermined number of the portions having the length of L1 and more are present per unit length of the wood material, and that: the portion having the board thickness deviated from the range of allowance extends a predetermined length L2(>L1) or more along the conveyance direction (claim 2). In this case, the determination as to whether the board thickness is deficient or not is made based on the two factors including the degree of the conveyance-wise length of the portion deviated in thickness from the range of allowance and the incidence of the thickness deficient portion. Hence, whether the board thickness is deficient or not can be determined correctly.

In the above apparatus for inspection of board thickness (claim 1), the displacement sensors may be disposed at a central position and positions near opposite ends with respect to the widthwise direction (claim 3). In this case, the board thicknesses are measured at three points including the central point. Therefore, the warpage or recess of the wood material can be assuredly detected.

In the above apparatus for inspection of board thickness (claim 1), an input device for entering a reference value for determination of the thickness deficient product may be connected to the processing unit (claim 4). In this case, the reference value for the determination of the thickness deficient product can be readily changed. Hence, a proper reference value can be programmed according to the grade or the like required of the wood material.

In the above apparatus for inspection of board thickness (claim 1), the differentiating device may be one that performs marking only on the wood material determined to be the thickness deficient one (claim 5). In this case, the marking provides for a definite and easy distinction of the thickness deficient product.

BEST MODE FOR CARRYING OUT THE INVENTION

Figure 3:
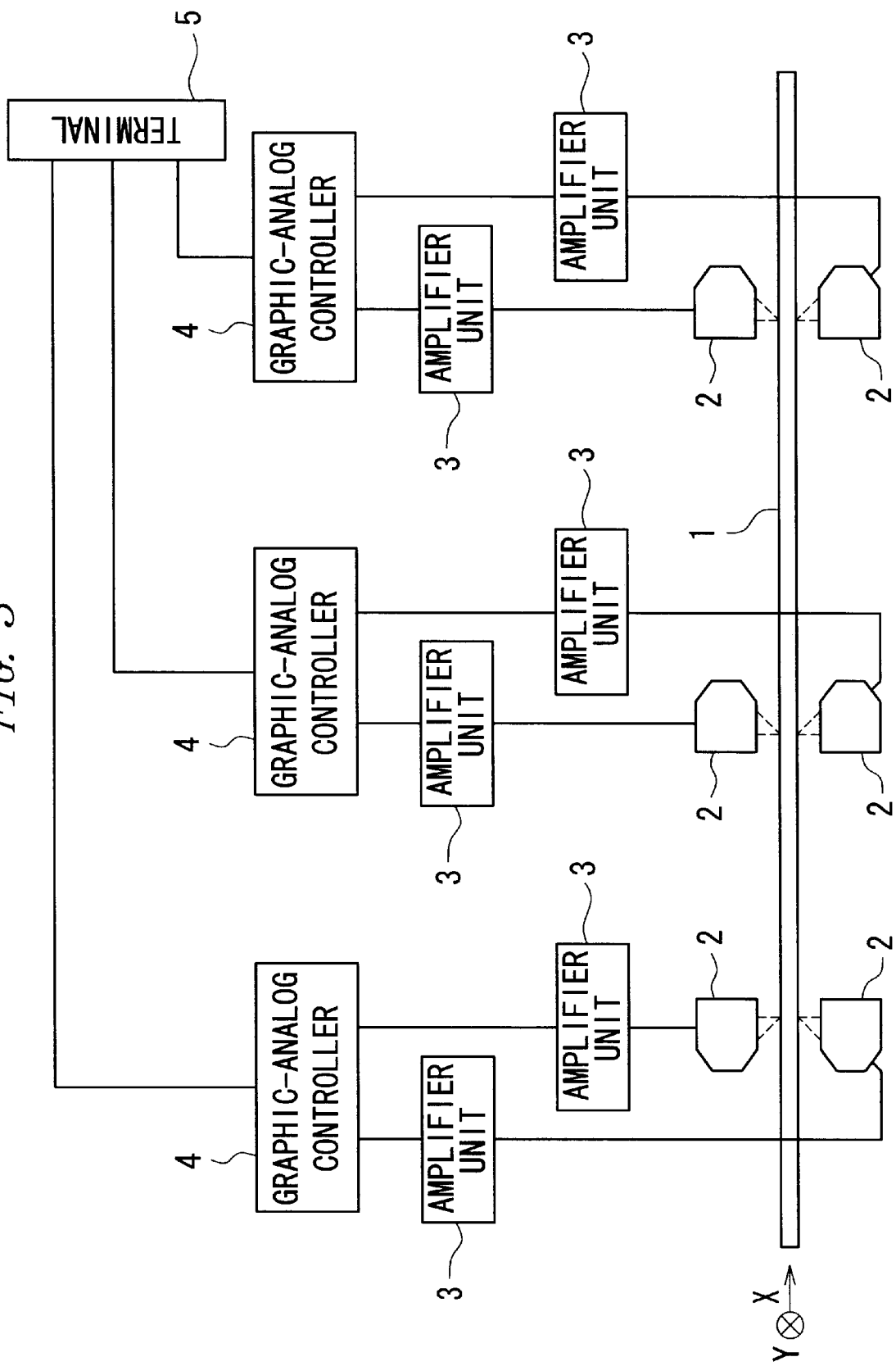
FIG. 3 is a diagram showing an arrangement (the first half thereof) of the above apparatus for inspection of board thickness.
Figure 4:
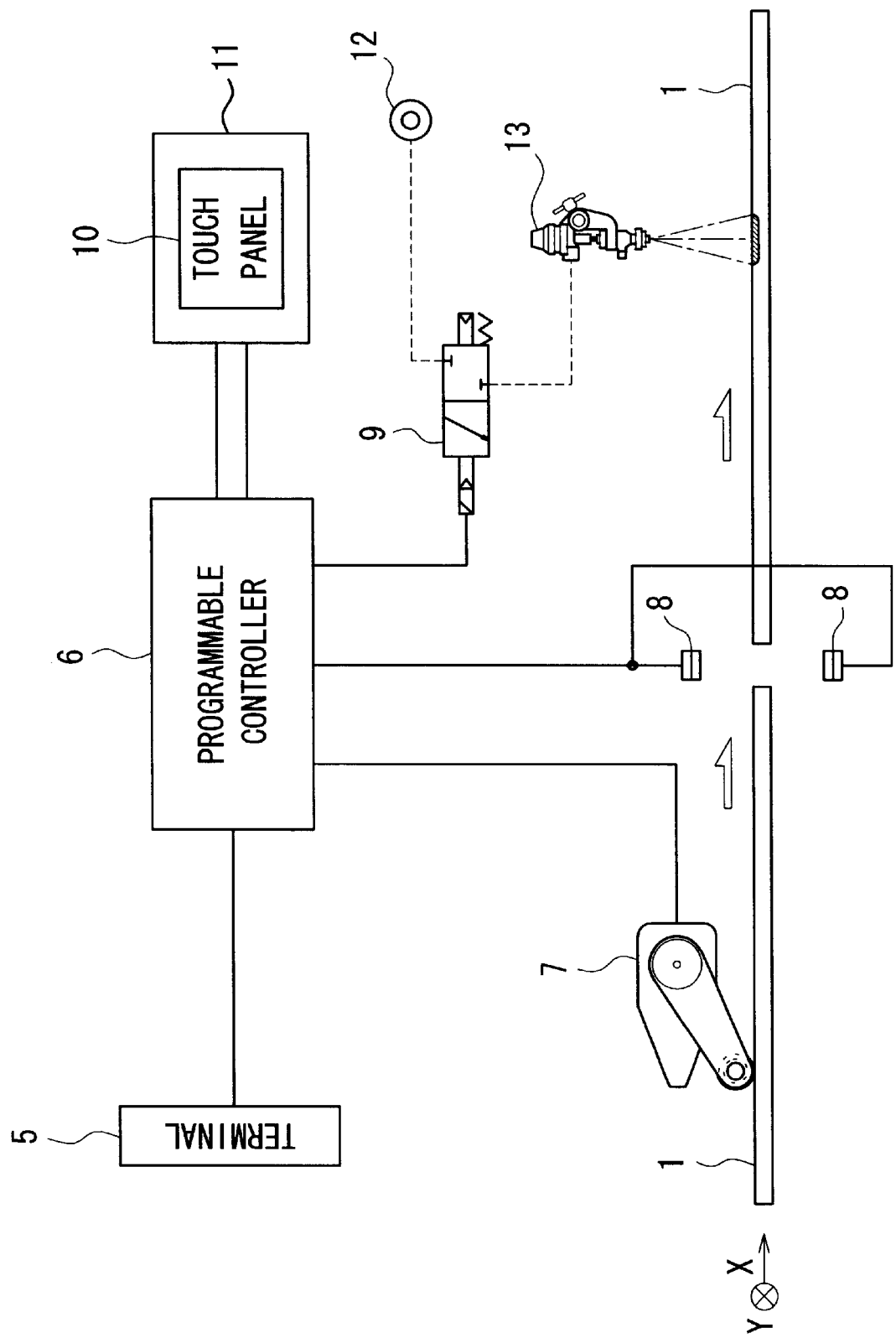
FIG. 4 is a diagram showing the arrangement (the second half thereof) of the above apparatus for inspection of board thickness.

FIG. 3 and FIG. 4 are diagrams showing an arrangement of an apparatus for inspection of board thickness according to one embodiment of the present invention. The two diagrams in combination show the arrangement of a single apparatus. Referring to FIG. 3, three pairs of displacement sensors 2 are disposed, each pair of sensors 2 located at places above and below relative to a workpiece (wood material) 1 conveyed thereto. Although the three sensor pairs 2 are depicted to be spaced far from each other along a conveyance direction (X direction in the figure) for convenience of illustration, the sensor pairs are actually located adjacent to each other. These sensor pairs are also located at places out of alignment with respect to a widthwise direction (Y direction in the figure) (detailed description to be given hereinlater). Each pair of vertically spaced displacement sensors 2 measure respective distances to an upper side and a lower side of the workpiece 1. The displacement sensors 2 are each connected to a graphic-analog controller 4 via an amplifier unit 3. An output signal from the displacement sensor 2 is amplified by the amplifier unit 3, whereas the graphic-analog controller 4 calculates a board thickness based on the amplified signals sent from a pair of amplifier units 3 and a real distance between a pair of sensors 2 vertically spaced from each other. A board-thickness measuring apparatus for determining the board thickness in this manner may be readily formed using CCD laser displacement sensors (LK series), amplifier units (LK series) and graphic-analog controllers (RJ), which are all commercially available from KEYENCE CORPORATION.

A board-thickness signal outputted from the graphic-analog controller 4 is sent to a programmable controller 6, shown in FIG. 4, via a terminal 5, the programmable controller serving as a processing unit. The programmable controller 6 is connected with a control panel 11 having a rotary encoder 7, a workpiece sensor 8, an electromagnetic valve 9 and a touch panel 10. The rotary encoder 7 provides an output indicative of the detection of the workpiece 1, whereas the programmable controller 6 calculates a length of the workpiece 1 based on a time period during which the detection output is provided and a conveying speed. The workpiece sensor 8 sends to the programmable controller 6 numerical information on the workpiece 1 passing thereby. The control panel 11 sends to the programmable controller 6 a value entered via the touch panel 10. The programmable controller 6, in turn, outputs to the control panel 11 information on the number of workpieces (conforming piece/defective piece) and the like. The electromagnetic valve 9 is connected with a compression air source 12 and a marking gun 13. The electromagnetic valve 9, in a valve position shown in the figure, is activated thereby causing the marking gun 13 to eject a paint of a predetermined color.

Figure 1:
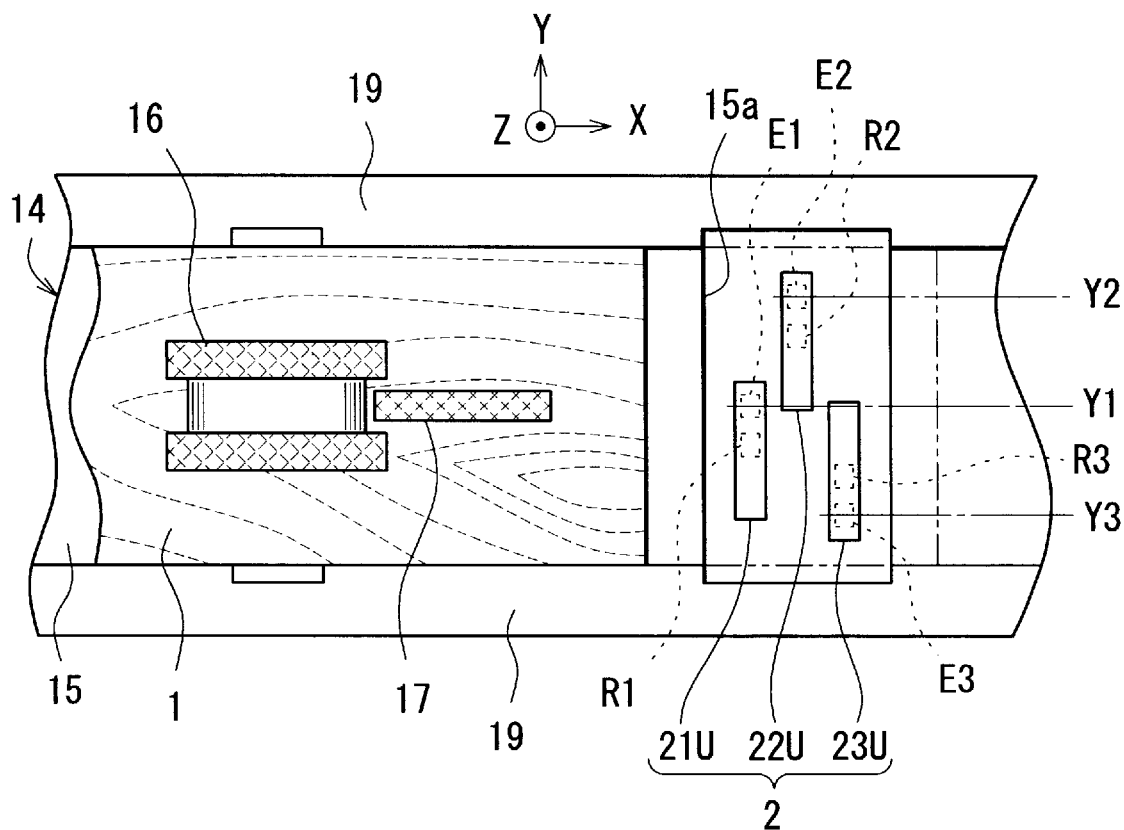
FIG. 1 and FIG. 2 are a top plan view and a vertical sectional view showing a positional relation between a conveyor and displacement sensors of an apparatus for inspection of board thickness according to one embodiment of the present invention.
Figure 2:
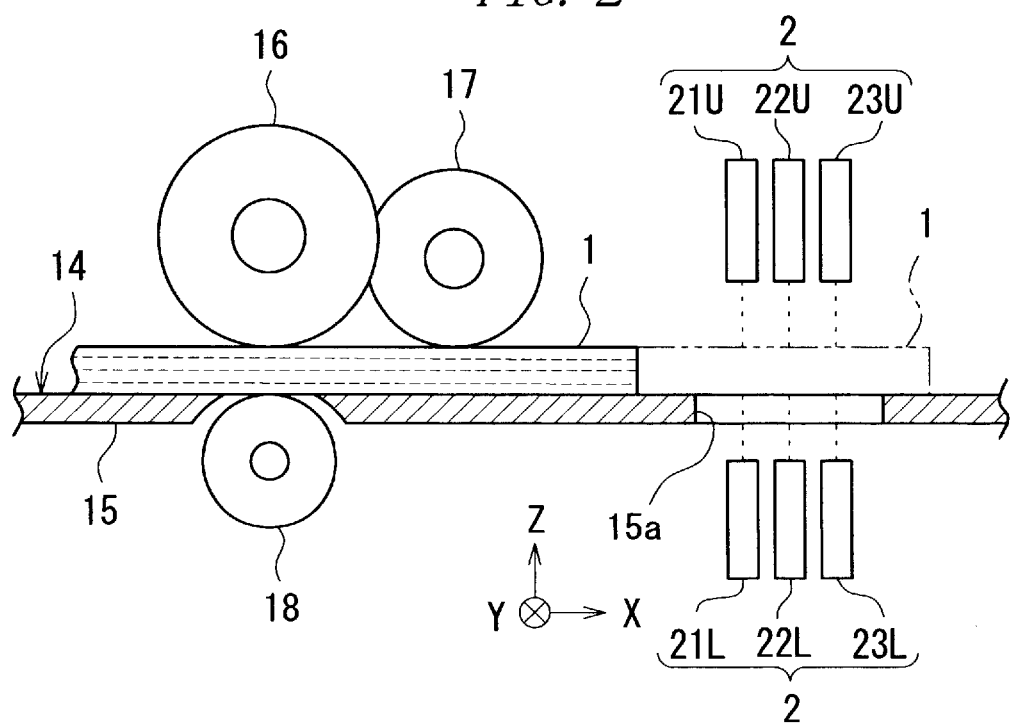

FIG. 1 and FIG. 2 are diagrams showing a positional relationship between a conveyor and the displacement sensors. FIG. 1 is a top plan view and FIG. 2 is a vertical sectional view. Referring to FIG. 1 and FIG. 2, a conveyor 14 includes a conveying path 15, a plurality of rollers 16, 17, 18 driven by an unillustrated motor, and lateral guides 19 (shown only in FIG. 1) for linear movement of the workpiece 1. Having been worked for adjustment of thickness to a predetermined value in the previous step, the workpiece 1 is conveyed along the X direction as driven by the plural rollers 16, 17, 18. An opening 15a is interposed in the conveying path 15, and three pairs of displacement sensors 2 are disposed at places above and below the opening 15a. The upper displacement sensors 21U, 22U, 23U each include a light-emission portion E1, E2, E3 and a light-reception portion R1, R2, R3 at a lower side thereof for emission/reception of laser light. On the other hand, the lower displacement sensors 21L, 22L, 23L individually include light-emission portions and light-reception portions at upper sides thereof for emission/reception of laser light, the light-emission/reception portions being in face-to-face relation with the light-emission/reception portions of the upper displacement sensors 21U, 22U, 23U.

The light-emission portions E1, E2, E3 of the upper displacement sensors 21U, 22U, 23U are located at different places Y1, Y2, Y3 with respect to the widthwise direction (Y direction). Specifically, the light-emission portion E1 of the displacement sensor 21U is disposed at place Y1 positioned centrally of the width, whereas the light-emission portions E2, E3 of the displacement sensors 22U, 23U are disposed at places Y2, Y3 near opposite ends with respect to the width. The lower displacement sensors 21L, 22L, 23L are disposed in the same way as the above. A thickness deficient portion of the workpiece 1 resulting from the warpage or bent thereof is often observed at any of the above places Y1, Y2, Y3. Therefore, the above arrangement of the sensors ensures that the displacement is positively detected. The reason for also arranging the displacement sensors 21U, 22U, 23U and 21L, 22L, 23L in shifted relation with respect to the conveyance direction (X direction) is because the displacement sensors 2 each have some great widthwise length, so that these sensors cannot be aligned on one line. If the displacement sensor is sufficiently short relative to the width of the workpiece 1, the sensors can be aligned on one line.

Next, operation of the apparatus for inspection of board thickness will be described with reference to a flow chart of FIG. 5. The flow chart is executed by the programmable controller 6. First, the touch panel 10 is manipulated for previously programming the programmable controller 6 with conditions based on which pass/fail of the workpiece 1 is determined. Specifically, a workpiece is determined to be a defective one if, for example, a thickness deficit in excess of an allowable shortage value $\Delta t$ (=0.25 mm) relative to a normal board thickness extends a predetermined length L1 (=60 mm) or more and not less than a predetermined number N (=3) of the above deficits having the length of L1 or more are present per unit length (=1 m). On the other hand, the presence of a single thickness deficit in excess of the above value $\Delta t$, which extends a predetermined length L2 (=300 mm) or more, constitutes a condition for determining a workpiece to be defective. Since such conditions vary depending upon the grades required of wood materials or uses thereof, plural patterns of conditions variously defining the above numerals in parentheses are previously prepared such that suitable conditions may be selected therefrom.

Figure 5:
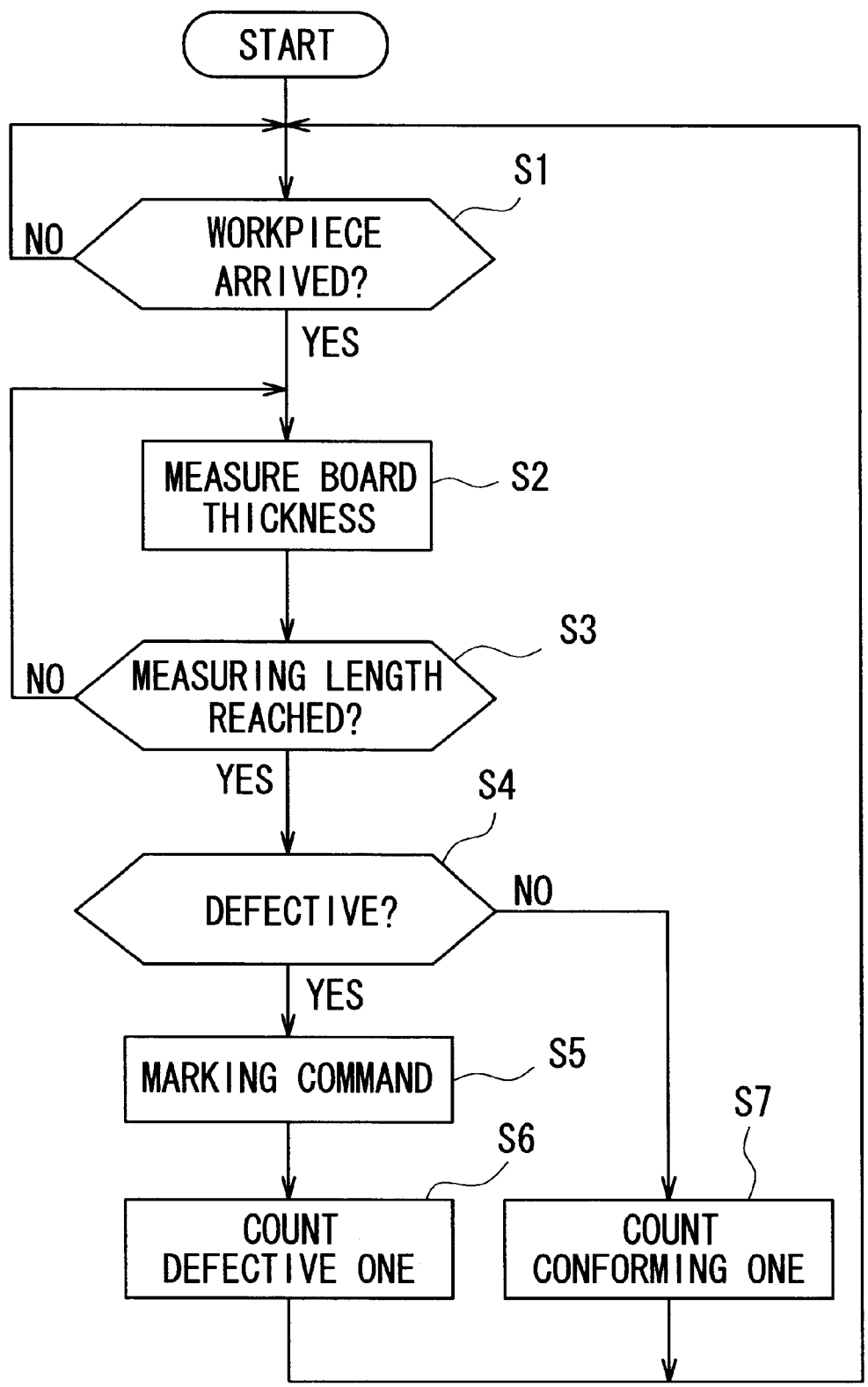
FIG. 5 is a flow chart representing control steps of the above apparatus for inspection of board thickness.

Referring to FIG. 5, the programmable controller 6 first waits for a workpiece 1 carried to place (Step S1). The arrival and passage of the workpiece 1 can be readily detected based on the change of outputs from the displacement sensors 2. At arrival of the workpiece 1, the programmable controller 6 takes measurement of board thickness (Step S2). The measurement of the board thickness is continued until a conveyance distance of the workpiece 1 reaches a measuring length or until the time when the workpiece 1 passes (Steps S2–S3 repeated in cycles). If it is determined in Step S2 that the thickness deficit exceeds the allowable shortage value $\Delta t$, the programmable controller 6 takes measurement on the length L of the extension of the thickness deficit. The length can be readily found using a conveying speed (a constant value) and a duration of a state where the thickness deficit in excess of the allowable shortage value Δt is present, wherein the duration is counted by a clock in the programmable controller 6. Further, the programmable controller 6 regards the presence of thickness deficit in excess of the allowable shortage value Δt extending not less than the length Las one event, and counts the number n of the occurrence of the event during the measurement.

When the conveyance distance of the workpiece 1 reaches the measuring length, the programmable controller 6 proceeds to Step S4 for determination as to whether the workpiece 1 is a defective one or not. In other words, the determination is made as to whether the aforesaid length L is not less than L1 or not and the aforesaid number n is not less than N or not, or whether the aforesaid L is not less than L2 or not. The determination is made in a moment because the operation speed of the programmable controller 6 far exceeds the conveying speed. If the workpiece is determined not to be defective, the programmable controller 6 increases the count of the conforming workpiece by one in Step S7 and returns to Step S1 for repeating the same processings on the next workpiece 1. If, on the other hand, the workpiece is determined to be defective, the programmable controller 6 outputs a marking command in Step S5. In Step S6, the programmable controller increases the count of the defective workpiece by one and then returns to Step S1. It is noted that the counts of the conforming products and of the defective products are displayed on the control panel 11.

Figure 6:
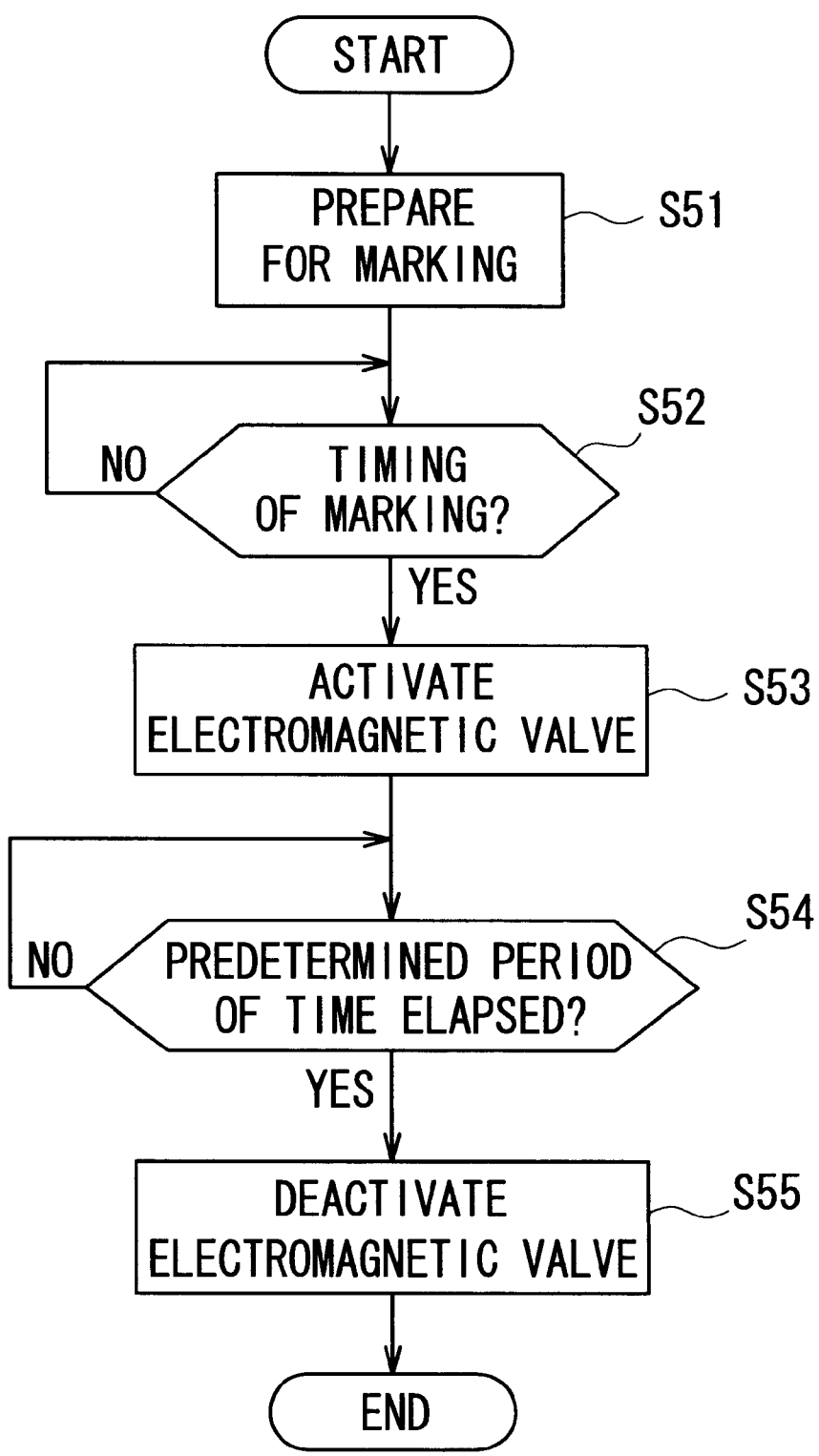
FIG. 6 is a flow chart representing marking operation of the above apparatus for inspection of board thickness.
Figure 7:
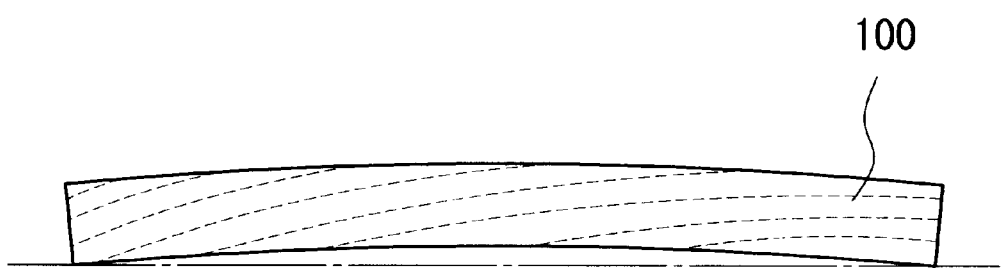
FIG. 7 and FIG. 8 are diagrams showing a warped wood board as seen from its longitudinal end, and the wood board worked for uniformalizing the thickness thereof, respectively.
Figure 8:
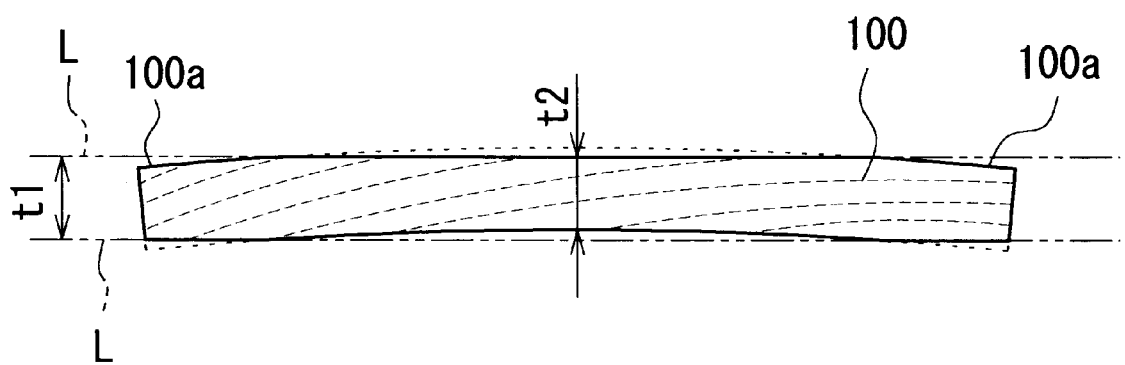

When the marking command is outputted, the programmable controller 6 performs the marking operation shown in a flow chart of FIG. 6 in parallel with the processings shown in FIG. 5 in a multitasking fashion. First, the programmable controller 6 prepares for the marking operation in Step S51 of FIG. 6. Specifically, a time period between the determination of a defective workpiece 1 and the arrival of the defective workpiece at place under the marking gun 13 (FIG. 4) is programmed via the touch panel 10. Based on this, the programmable controller 6 starts a timer, and waits for a marking timing (Step S52). At the marking timing, the programmable controller 6 activates (energizes) the electromagnetic valve 9 (FIG. 4), so that compression air is supplied to the marking gun 13 for marking (ejecting a red paint, for example) on the defective workpiece 1. After the lapse of a given time period for marking (Step S54), the programmable controller 6 deactivates the electromagnetic valve 9 (Step S55) to terminate the marking operation.

In the aforementioned manner, the thickness deficient workpiece 1 is recognized at the end of conveyance over the measuring length and is differentiated from the other normal wood materials by way of marking. The visual inspection by an inspector is not needed and hence, the conveying speed can be increased so as to permit the speedy inspection. Furthermore, the quality of the inspection remains invariant because the board thickness is measured by means of the displacement sensors located at plural positions. Accordingly, wood materials of stable quality can be offered.

In the foregoing embodiment, since the thickness deficit tends to occur at any of the positions Y1, Y2, Y3, shown in FIG. 1, of the workpiece 1, as mentioned supra, the board thickness is measured at these three points. In a case where the inspection subject is a lumber of a relatively small diameter, the board-thickness measurement at the three points is substantially adapted for the inspection of 100% reliability. However, the number of measurement points may be increased or decreased depending upon the width or type of the workpiece, or the required grade thereof. It is noted, however, that the board thickness may preferably be measured at least at two points because one-point measurement has a fear of poor reliability.

Although the above embodiment has been described by way of example of the board-like workpiece 1, square timbers for use as pillar or beam (having a square or rectangular sectional area) can be inspected for vertical/horizontal dimensions of the sections thereof just the same way as the board thickness is inspected. Furthermore, a widthwise dimension of the board-like wood material can be inspected by means of a pair of displacement sensors located at transversely opposite ends of the board just the same way as the board thickness is inspected or regarding the widthwise dimension as "board thickness" in a broad sense.

In the foregoing embodiment, the work for previously adjusting the board thickness is performed prior to the inspection. The work generally limits the maximum board thickness by way of the position of the tools and hence, errors of positive values are not produced. However, the above apparatus for inspection of board thickness may be similarly applied to wood materials previously subjected to work which will even produce the errors of positive values.

What is claimed is:

1. An apparatus for inspection of board thickness comprising:
    an apparatus for conveying a wood material worked for adjustment of board thickness thereof to a predetermined value;
    a board-thickness measuring apparatus for determining board thicknesses at plural points of the wood material as a measurement subject conveyed thereto based on outputs from displacement sensors located at plural different positions with respect to a widthwise direction of the wood material;
    a processing unit for determining the wood material to be a thickness deficient one if it is determined from the measurement results given by said board-thickness measuring apparatus that there is a predetermined amount of portion having a board thickness deviated from a range of allowance for said predetermined value along a conveyance direction; and
    a device for differentiating the wood material determined to be the thickness deficient one from the other wood materials.

2. The apparatus for inspection of board thickness as claimed in claim 1, wherein
    said processing unit determines the wood material to be a thickness deficient one based on at least one of the conditions that
    the portion having the board thickness deviated from the range of allowance extends a predetermined length L1 or more along the conveyance direction, and not less than a predetermined number of the portions having the length of L1 and more are present per unit length of the wood material, and that
    the portion having the board thickness deviated from the range of allowance extends a predetermined length L2(>L1) or more along the conveyance direction.

3. The apparatus for inspection of board thickness as claimed in claim 1, wherein
    said displacement sensors are disposed at central position and positions near opposite ends with respect to said widthwise direction.

4. The apparatus for inspection of board thickness as claimed in claim 1, wherein
    an input device for entering a reference value for determination of the thickness deficient product is connected to said processing unit.

5. The apparatus for inspection of board thickness as claimed in claim 1, wherein
    said differentiating device performs marking only on the wood material determined to be the thickness deficient one.

* * * * *